Patented Oct. 28, 1930

1,779,942

UNITED STATES PATENT OFFICE

PHILIP ADOLPH KOBER, OF CHICAGO, ILLINOIS

PROCESS OF MAKING DIALYZING AND PERVAPORATING MEMBRANES AND PRODUCT PRODUCED THEREBY

No Drawing. Original application filed June 17, 1918, Serial No. 240,468. Divided and this application filed November 26, 1926. Serial No. 151,027.

This invention relates to improvements in the manufacture and composition of membranes and membrane containers, usable in the well known art of dialyzing and in the well known art of pervaporation and percrystallization, described in the Journal of the American Chemical Society, vol. 39, page 944, (1917). This application is a division of my copending application Serial No. 240,468, filed June 17, 1918.

The membranes usually made and used for these arts may be divided into two classes. The first class consists of parchment paper and certain natural membranes. The second class consists of those made from collodion and gelatine and similar solutions. The first class of membranes can be used over and over again, but have the disadvantage of being difficultly shaped into various forms, such as bottles, flasks, tubes, etc. The second class of membranes can be shaped or moulded into almost any form; but collodion containers cannot be used over and over again, while gelatine membranes are too fragile for most purposes.

It is also well known that collodion membranes shrink enormously and become hard and impermeable when subjected to drying in part or in whole.

I observed that gelatine, jellos and jellies in domestic use, although containing much water in their composition do not dry or shrivel up, no matter how long they stand at room temperatures. It, therefore, occurred to me that if I could make a gel from collodion and gelatine, it would solve the problem, and give us a membrane which could be moulded or shaped as desired, which would not shrink and could be used over and over again.

This I succeeded in doing and the membranes made by the method here disclosed do not shrink and are usable and permeable anew at once without further treatment, for the purpose of dialyzing and pervaporating.

To make such membranes, I prefer to go about the process as follows:

Thirty grams of collodion are dissolved in 100 grams of glacial acetic acid. Thirty grams of gelatine are dissolved in another 100 grams of the same solvent, glacial acetic acid. Then the two solutions are mixed until homogeneous. Other proportions can be also used to advantage, such as 1 part collodion and 3 to 4 parts of gelatine, or 2 parts of collodion and 1 part of gelatine. After thorough mixing, the collodion-gelatine solution is poured into the mould of shape desired, made of glass or any other suitable material. On evaporation of the solvent either by blowing air through the mould or shape by pressure or by suction or allowing spontaneous evaporation the layer of collodion-gelatine remains as a hard membrane. After removing most of the solvent in the manner indicated the membrane is then treated with water, whereupon the membrane imbibes water and becomes a gel. It is then usable for dialyzing or pervaporation or any other useful purpose.

It was then found that peptones could be substituted for gelatine in this composition and similar results obtained. The collodion-peptone-gel membranes also possess the property of percrystallization, which the collodion-gelatine-gel membranes do not seem to possess.

It will be observed that my invention and discovery shows that proteins or protein like products or derivatives found in nature or made in the laboratory from proteins by digestion or hydrolysis, may be found suitable to mix with collodion or similar cellulose compounds, which have a common acid solvent. It will be understood, therefore, that this invention will not be limited to any particular cellulose or nitro-cellulose compound, nor any particular protein or protein derivative, or digestion or hydrolysis product of protein (all of which have the amino or imino grouping capable of forming acid salts with acids), nor limited to any particular acid solvent, nor the relative amount of solvent used. It is obvious to those skilled in the art that any acid such as butyric acid, if cheap enough could be substituted for acetic acid.

That this method of making membranes allows those skilled in the art to vary the permeability by varying the concentrations of one or the other constituents or both, is obvious from the literature on the subject of membrane permeability, and will be understood to flow from this disclosure. Under the term "protein substance" used in the claims, I intend to include all proteins, protein derivatives, digestion products of protein, hydrolysis products of protein, and the like, having an amino or imino grouping capable of forming salts with acids.

The term "homogeneous mixture" as used in the appended claims will be understood as having its ordinary meaning except insofar as it is used in defining the composition including the imbibitory liquid (e. g. water). When so used, it is to be understood as meaning that water has been imbibed by the membrane formed from a homogeneous mixture of the cellulose derivative and the protein substance so as to be substantially uniformly distributed therein; hence while in one sense the product or article claimed may be referred to as a homogeneous mixture of the cellulose derivative, the protein substance and water, it is probably more correctly described as a homogeneous mixture of water and the cellulose derivative-protein substance composition.

I claim:

1. The process of making a permeable membrane, consisting in dissolving a cellulose derivative and a protein substance in a common solvent, forming the solution into a membrane by removal of the solvent, and treating the formed membrane with an imbibitory liquid.

2. The process of making a permeable membrane, consisting in dissolving nitro-cellulose and a protein substance in a common solvent, forming the solution into a membrane by removal of the solvent, and treating the formed membrane with an imbibitory liquid.

3. The process of making a permeable membrane, consisting in dissolving collodion and a protein substance in a common acid solvent, forming the solution into a membrane by removal of the solvent, and treating the formed membrane with water, to cause imbibition thereof by said membrane, thereby imparting permeability to said membrane.

4. The process of making a permeable membrane, consisting in dissolving a cellulose derivative and gelatine in a common solvent, forming the solution into a membrane by removal of the solvent, and treating the formed membrane with an imbibitory liquid.

5. The process of making a permeable membrane, consisting in dissolving nitro-cellulose and gelatine in a common solvent, forming the solution into a membrane by removal of the solvent, and treating the formed membrane with an imbibitory liquid.

6. The process of making a permeable membrane, consisting in dissolving collodion and gelatine in a common acid solvent, forming the solution into a membrane by removal of the solvent, and treating the formed membrane with water, to cause imbibition thereof by said membrane, thereby imparting permeability to said membrane.

7. The process of making a permeable membrane, comprising dissolving a cellulose derivative and a protein substance in a common solvent, forming a membrane by substantially removing the solvent, and before change decreasing the permeability of the membrane has taken place, treating the formed membrane with an imbibitory liquid.

8. The process of making a permeable membrane, comprising dissolving a nitro-cellulose compound and gelatine in a common solvent comprising a carboxylic acid of the aliphatic group, forming a membrane by substantially removing the solvent, and treating the formed membrane before drying with an imbibitory liquid.

9. A permeable membrane composed of a homogeneous mixture comprising a cellulose derivative and a protein substance.

10. A permeable membrane composed of a homogeneous mixture comprising nitro-cellulose and a protein substance.

11. A permeable membrane composed of a homogeneous mixture comprising nitro-cellulose and gelatine.

12. A permeable membrane composed of a homogeneous mixture of a cellulose derivative, a protein substance and water.

13. A permeable membrane composed of a homogeneous mixture of nitro-cellulose, a protein substance and water.

14. A permeable membrane composed of a homogeneous mixture of nitro-cellulose, gelatine and water.

In testimony whereof, I have signed my name to this specification this 22nd day of November, 1926.

PHILIP ADOLPH KOBER.